Patented Aug. 18, 1925.

1,550,109

UNITED STATES PATENT OFFICE.

ALFRED E. SHERNDAL, OF NEW YORK, N. Y., ASSIGNOR TO HERMAN A. METZ, OF NEW YORK, N. Y.

PROCESS OF MAKING ALKALI-METAL COMPOUNDS OF ARSENOPHENOLS.

No Drawing. Application filed July 6, 1921. Serial No. 482,811.

*To all whom it may concern:*

Be it known that I, ALFRED E. SHERNDAL, a citizen of the United States, residing at New York, in the county of New York and State of New York, have invented certain new and useful Improvements in Processes of Making Alkali-Metal Compounds of Arsenophenols, of which the following is a specification.

This invention relates to a process of making alkali metal salts of organic compounds, the process being applicable to all organic compounds which are soluble in organic solvents, such as alcohol, and which contain a salt forming group, such as the hydroxyl group, the carboxyl group and the sulfonic acid group. The process is particularly adapted to the manufacture of alkali metal compounds of phenolates, such as diamino-dihydroxyarsenobenzene.

Alkali metal organic compounds are formed, ordinarily, in concentrated solutions from which they are precipitated by means of alcohol, ether or mixtures thereof. This method is employed almost exclusively in the preparation of alkali metal compounds of diamino-dihydroxyarsenobenzene.

The method possesses certain disadvantages.

As is well known it is essential that derivatives of diamino-dihydroxyarsenobenzene for intravenous injection be as free as is possible from toxic ingredients. It is also well known that, in common with other phenolates, the concentrated alkaline solutions of diamino-dihydroxyarsenobenzene are very sensitive to oxidation, forming toxic substances. Alkaline solutions of phenolates, such as diamino-dihydroxyarsenobenzene, when exposed to the air quickly darken on account of oxidation and decomposition, and are very sensitive to the action of carbon dioxide. Consequently, in the treatment of such solutions the greatest precautions are necessary, and particularly the complete exclusion of atmospheric oxygen, in order to prevent the formation of toxic products. Even when air is completely excluded, such solutions are very sensitive and the utmost speed of operation is requisite for the successful preparation of a product without undue toxicity.

Furthermore it has been shown that the preparation of the sodium compound of diamino-dihydroxyarsenobenzene by means of isolation from solution, produces a marked change in its physiological action, so that solutions of the resulting products are no longer therapeutically or toxicologically equivalent to the alkalinized solutions of the original dihydrochlorides of the diamino-dihydroxyarsenobenzenes containing an equal amount of arsenic.

A further disadvantage of the old method of preparing alkali metal phenolates, as well as other alkali organic compounds, is the necessity of using anhydrous alcohol and ether for the precipitation. If the strength of the alcohol falls below 99% the precipitation is unsuccessful, the product separating in the form of a pasty mass instead of in the form of a clean sandy precipitate. The preparation of alcohol and ether suitable for the process is expensive and involves considerable technical difficulty.

I have found that aklali metal organic compounds, and particularly the sodium compound of diamino-dihydroxyarsenobenzene, can be successfully prepared and the above mentioned difficulties avoided by the following procedure:

I dissolve the dihydrochlorid of diamino-dihydroxyarsenobenzene in a small quantity of anhydrous methyl alcohol and add a proper amount of a stabilizer, such as sodium formaldehyde sulfoxylate, glucose, mannitol, or other polyhydric alcohol. The resulting clear, acid, alcoholic solution contains the arseno compound in its most stable form. It is not affected by carbon dioxid and is substantially unacted upon by atmospheric oxygen.

In order to produce the disodium phenolate product I run the solution of the dihydrochlorid into a large volume of 95% alcohol to which has been previously added the requisite amount of caustic soda, in the form of a normal alcoholic solution. The disodium salt with some sodium chlorid and stabilizer immediately precipitates in the form of a sandy, practically anhydrous powder. After decanting, filtering, washing with ether and drying, the precipitate forms a yellow powder which dissolves readily in cold water, giving a clear yellow alkaline solution which is ready for intravenous injection without further manipulation.

On exposure to air, the product retains its original appearance and is apparently unaltered for a considerable length of time.

My invention is further illustrated by the following example, it being understood that my invention is not limited to the specific reagents and procedure involved, the invention being of general application as is pointed out above.

Dissolve 24 grams of arsphenamin in 100 cc. of anhydrous methyl alcohol at room temperature. Add to this solution 6 grams of mannitol dissolved in 30 cc. of distilled water. Run the clear solution slowly with stirring into 2250 cc. of 95% alcohol to which has been previously added 200 cc. of normal alcoholic sodium hydroxid solution. The sodium compound of diamino-dihydroxyarsenobenzene immediately separates as a sandy yellow precipitate. Add to the mixture 1600 cc. of ether and thoroughly mix by stirring. Separate the sodium compound by filtering, wash with 200 cc. of ether and remove the residual ether by suction. The resulting product is a fine yellow powder instantaneously soluble in cold water and has an arsenic content of 23.6%.

A distinguishing characteristic of my process as will be apparent from the above examples, is the formation of the alkali metal oganic compound in an alcoholic or other non-aqueous solution in which the alkali metal organic compound is insoluble as distinguished from prior methods in which the alkali metal compounds are formed in solution.

The sodium compound of diamino-dihydroxyarsenobenzene is distinguished from previously known products by its greater freedom from decomposition products and by its relatively greater stability.

Furthermore, it exhibits certain very important chemotherapeutic advantages over previous products of this general nature, in that the toxicological and therapeutic identity of the original diamino-dihydroxyarsenobenzene dihydrochloride is not changed. The new product as herein described, forms a solution which on an arsenic basis is equivalent in toxicity and therapeutic effect to an alkalinized solution of the original diamino - dihydroxyarsenobenzene dihydrochloride, and is thereby distinguished from previously known products.

I claim:

1. Process of preparing stable alkali metal compounds of arsenophenols and their substitution derivatives, which comprises combining said arsenophenols with alkali metals in a medium in which the resulting alkali metal compounds are insoluble.

2. Process of preparing stable alkali metal compounds of arsenophenols and their substitution derivatives, which comprises dissolving said arsenophenols in alcohol in the presence of a stabilizer, mixing the solution with a relatively large volume of an alcoholic solution of caustic alkali whereby alkali metal compounds of the arsenophenols insoluble in the reaction mixture are formed, and separating the precipitate from the reaction mixture.

3. Process for preparing disodium diamino-dihydroxyarsenobenzene which comprises preparing a concentrated alcoholic solution of diamino-dihydroxyarsenobenzene dihydrochloride, adding mannitol to said solution, mixing said solution with a relatively large volume of an alcoholic solution of caustic soda, and separating, washing and drying the resulting precipitate.

4. Alkali metal compounds of arsenophenols and their substitution products such as may be prepared by the direct transformation of the acid salts of arsenophenols into the anhydrous alkali metal compounds, said compounds differing in physical, toxicological and therapeutic properties from similar compounds obtained from alkaline solutions thereof.

5. Alkali metal compounds of arsenophenols such as may be prepared by the hereindescribed process, which comprises reacting upon the acid salts of arsenophenols with a caustic alkali in a liquid medium in which the alkali metal compounds of the arsenophenols are insoluble, said compounds being dry yellow powders, readily soluble in cold water forming solutions which are toxicologically and thereapeutically equivalent to alkalinized solutions of the corresponding arsenophenols.

In testimony whereof, I affix my signature.

ALFRED E. SHERNDAL.